United States Patent [19]  [11] 4,265,087
Peeples  [45] May 5, 1981

[54] HYDRAULIC MOTOR SEAL AND VALVE ARRANGEMENT

[75] Inventor: Denny L. Peeples, Dayton, Ohio

[73] Assignee: General Motors Corporation, Detroit, Mich.

[21] Appl. No.: 84,054

[22] Filed: Oct. 11, 1979

[51] Int. Cl.³ .......................................... B60T 13/12
[52] U.S. Cl. ................................. 60/550; 91/391 R; 91/438; 417/511
[58] Field of Search ............... 60/550, 589; 91/391 R, 91/438; 417/511, 512

[56] References Cited

U.S. PATENT DOCUMENTS

| 2,404,547 | 7/1946 | Strid | 417/511 |
|---|---|---|---|
| 3,224,378 | 12/1965 | Graham | 417/511 |
| 3,525,530 | 8/1970 | Bauer | 277/165 |
| 3,877,347 | 4/1975 | Sheesley | 91/438 |
| 4,028,891 | 6/1977 | Belart | 60/550 |
| 4,061,079 | 12/1977 | Orth | 91/391 R |
| 4,099,380 | 7/1978 | Cadeddu | 60/588 |

FOREIGN PATENT DOCUMENTS 2522254 12/1975 Fed. Rep. of Germany ........ 91/391 R

Primary Examiner—Abraham Hershkovitz
Attorney, Agent, or Firm—D. D. McGraw

[57] ABSTRACT

The hydraulic brake booster power piston has a rectangular cross section seal groove containing a rectangular cross section lathe cut seal having a greater inner diameter than the groove as well as a greater outer diameter. Radial clearance is provided between the piston and the cylinder wall. The groove has one or more holes at its inner diameter opening axially into the booster power pressure chamber. The seal is also axially thinner than the groove. Power pressure holds the seal in sealing relation with the cylinder wall and the piston. When fluid must flow from the exhaust chamber side of the piston to the power chamber side (e.g. during manual no-power operation) the seal moves to the other groove side, allowing flow radially inward in the groove and past the seal inner periphery through the hole or holes to the power chamber.

2 Claims, 3 Drawing Figures

HYDRAULIC MOTOR SEAL AND VALVE ARRANGEMENT

The invention relates to a power piston valve and seal arrangement in which a lathe cut seal is fitted in a piston groove so that when power pressure is applied to the piston the seal effectively prevents fluid leakage. When the power piston is being moved manually instead of by hydraulic pressure, the seal relocates itself in the piston groove and opens a vent path from the exhaust chamber to the power chamber. This permits the power piston to be moved manually without having to overcome a hydraulic fluid block or having to force hydraulic fluid from the exhaust chamber through the outlet port.

Figure 1:
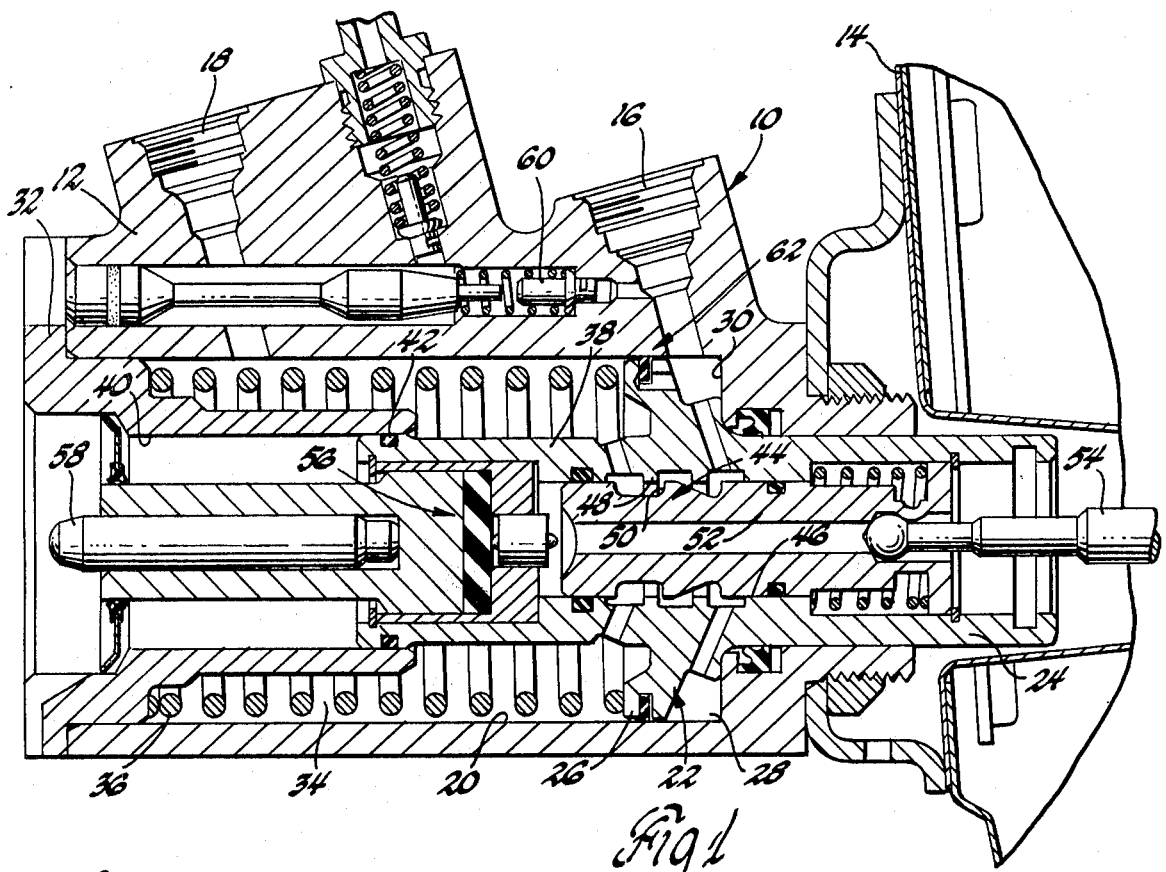
FIG. 1 is a cross section view with parts broken away of a hydraulic brake booster having a seal and valve arrangement embodying the invention.

The hydraulic motor 10 includes a housing 12 which is illustrated as being suitably mounted to the wall 14 of a vehicle in which the motor is installed. The particular motor disclosed is a hydraulic brake booster. The housing is provided with an inlet port 16 which may be connected to receive hydraulic fluid from a suitable pump such as the power steering gear pump. The housing has an outlet port 18 which may be connected to return hydraulic fluid to the pump reservoir. Since the general arrangement of hydraulic brake boosters in hydraulic systems containing power steering gear pumps, power steering gears and associated piping are well-known in the art, the entire system is not illustrated. A housing 12 has a cylinder or bore 20 formed therethrough. A reciprocably movable pressure responsive piston 22 is mounted in cylinder 20 and is the power piston of the hydraulic brake booster. Piston 22 has a smaller diameter rear extension 24 which extends through a reduced diameter portion of cylinder 20 for guidance, and a larger diameter land 26 which is fitted in the larger diameter portion of cylinder 20. A power pressure chamber 28 is defined by the rear wall of land 26, a reduced diameter part of piston 22 extending rearwardly from land 26, and a portion of cylinder 20 including the annular rear wall 30. Inlet port 16 opens into chamber 28. The forward side of land 26 cooperates with the forward portion of cylinder 20 and a removable end wall 32 to define an exhaust chamber 34. A piston return spring 36 in chamber 34 acts against end wall 32 and the piston land 26 to continually urge the piston 22 to the released position illustrated. Piston 22 has a forward extension 38 which extends into a bore 40 of end wall 32 for guidance. A seal 42 seals forward extension 38 and bore 40 while permitting reciprocal movement of the piston extension in the bore.

A control valve assembly 44 is received in a bore 46 of piston 22 and is of the open center type. Valve members 48 and 50 are respectively formed on piston 22 and the valve plunger 52 of assembly 44. A push rod 54 is connected to valve plunger 52 and arranged to move the valve plunger axially within bore 46 to control the pressure operation of the hydraulic motor 10, in a manner well-known in the art. A reaction section 56 is contained within piston 22 forwardly of valve plunger 52 and is connected to the output rod 58. The reaction section 56 is of the well-known disc rubber reaction type. Output rod 58 is arranged to transmit force mechanically from motor 10 to a brake master cylinder assembly, not illustrated. The housing 12 also includes a pressure limiting bypass valve 60 between inlet 16 and outlet 18.

The land 26 of piston 22 has a seal and valve arrangement 62 which is the subject of the invention herein disclosed and claimed. Arrangement 62 is shown in greater detail in FIGS. 2 and 3. Land 26 has an outer peripheral surface 64 which is radially spaced inwardly from the wall of cylinder 20. A generally rectangular cross section groove 66 is formed in land 26 and opens radially outwardly through surface 64. As seen in cross section, groove 66 has a bottom wall 68, a forward side wall 70 and a rear side wall 72. One or more axially extending passages 74, which may be drilled recesses circumferentially spaced on land 26, extend from the side of the land forming a part of power chamber 28 into the land radially inwardly of surface 64 so as to intersect the radially inner portion 76 of groove rear side wall 72, bottom wall 68, and the radially inner portion 78 of forward groove side wall 70.

A lathe cut rubber-like annular seal 80 is provided in groove 66. Seal 80 is generally rectangular in cross section and has an outer peripheral surface 82 which is in slidable sealing engagement with the wall of cylinder 20. The seal 80 has a forward side wall 84 and a rear side wall 86. The seal inner peripheral surface 88 is positioned radially outwardly of and radially spaced from groove bottom wall 68.

In normal operation of the hydraulic motor 10, hydraulic fluid is supplied through inlet port 16 to power chamber 28 and passes through the open control valve assembly 44 to the exhaust chamber 34 and out through outlet port 18 with no substantial flow resistance. Therefore no substantial power pressure is built up in pressure chamber 28 and piston 22 remains in the released position illustrated in FIG. 1. When the vehicle operator desires to apply the vehicle brakes, he moves the brake pedal to which push rod 54 is connected so as to cause leftward or forward movement of that push rod as seen in FIG. 1. This causes control valve assembly 44 to restrict hydraulic fluid flow therethrough, causing hydraulic power pressure to be built up in chamber 28. This pressure acts against piston 22 to move the piston leftwardly against the force of spring 36 and to actuate a master cylinder assembly by movement of output rod 58 through reaction section 56. The hydraulic power pressure so generated, illustrated in FIG. 3 by arrows 90, acts on the rear side wall 86 and bottom wall 68 of seal 80 so that the forward seal side wall 84 tightly engages and seals against the forward groove side wall 70, and the seal outer peripheral surface 82 more tightly seals against the wall of cylinder 20. The hydraulic pressure may cause some distension of the seal, as illustrated at 92, because of the clearance between the piston outer peripheral surface 64 and cylinder 20. However, this merely increases the sealing effect. Upon brake release, the piston 22 will be moved rearwardly by spring 36 and seal 80 will be retained in position against the forward groove side wall 70.

Figure 2:
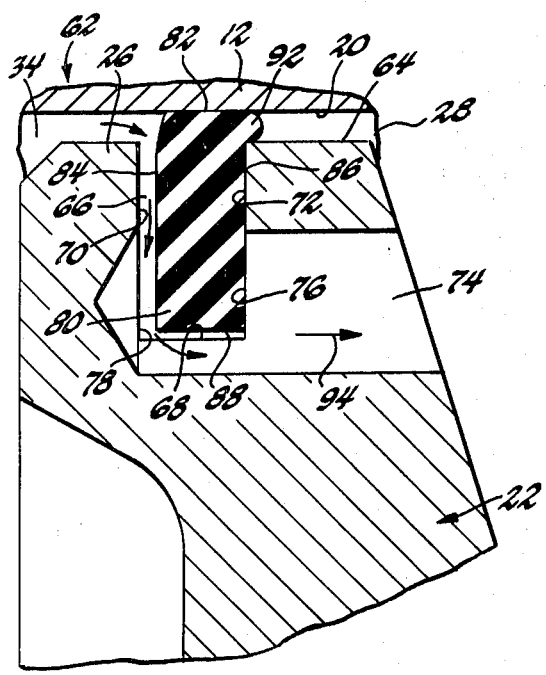
FIG. 2 is a fragmentary enlarged view of the seal and valve arrangement of FIG. 1 showing the open fluid flow path position of the seal.
Figure 3:
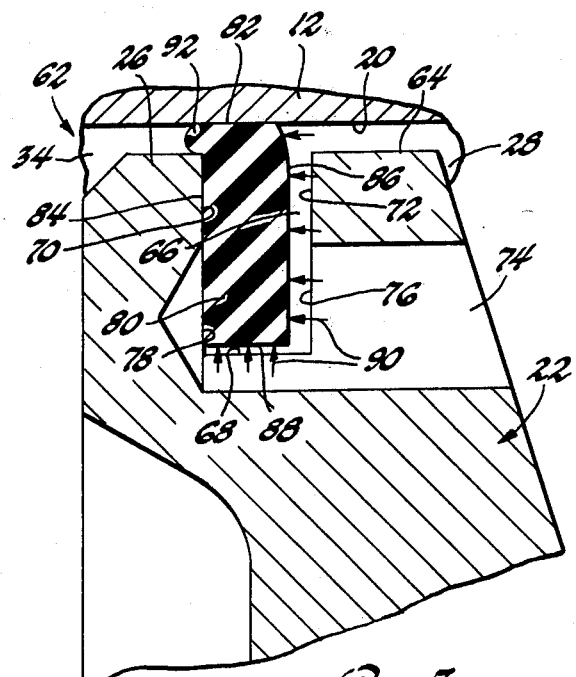
FIG. 3 is similar to FIG. 2 and illustrates the seal in its sealing position for normal fluid power operation.

It will be noted, that the axial thickness of the seal 80, as measured between side walls 70 and 72, is less than the axial width of groove 66 between groove side walls 70 and 72 so that there is always substantial axial clearance between one pair of adjacent seal and groove side walls. If the master cylinder assembly is to be manually operated by the vehicle operator due to lack of hydraulic pressure at inlet 16, for example, the operator will move push rod 54, which will in turn move valve plunger 52, causing a mechanical path to be provided through reaction section 56 to output rod 58. Piston 22 will be moved leftwardly with the rods 54 and 58. During such manual operation, control valve assembly 44 is substantially closed so that no fluid flow passes through the valve assembly. Without providing some type of fluid relief, the leftward movement of piston 22 would also have to displace hydraulic fluid from exhaust chamber 34 in addition to overcoming the force of return spring 36. The seal and valve arrangement 62 provides for the relatively free flow displacement of the fluid in exhaust chamber 34 to the power chamber 28 as the exhaust chamber displacement is decreased and the power chamber displacement is increased. To this end, the movement of piston 22 leftwardly will result in the relocation of seal 80 in groove 66 to the position shown in FIG. 2. This readily occurs since there is some seal drag between seal surface 82 and the wall of cylinder 20 so that the piston 22 can move slightly leftward relative to the seal. This relative movement opens a fluid flow path indicated by arrows 94. This path leads from exhaust chamber 34, over the portion of land 26 forward of groove 66, radially inwardly in groove 66 between the axially spaced groove and seal side walls 70 and 84, under seal inner peripheral surface 88, and through passage 74 into power chamber 28. Upon release of manual operation, the valve assembly 44 again opens so that fluid being displaced from power chamber 28 can readily flow back to exhaust chamber 34. Also, the seal drag will again allow piston 22 to move axially relative to the seal 80 until the seal side wall 84 once again engages groove side wall 70, returning the seal 80 to a valve closed position similar to that shown in FIG. 3. The seal and valve arrangement is then in position to operate normally to close the fluid flow path indicated by arrows 94 if power pressure is again available in chamber 28. If not, the seal again operates as shown in FIG. 2.

The embodiments of the invention in which an exclusive property or privilege is claimed are defined as follows:

1. In a hydraulic motor having a cylinder, a pressure responsive piston reciprocably received in said cylinder and dividing said cylinder into a pressure chamber and an exhaust chamber, means for selectively causing hydraulic pressure in said pressure chamber to act on said piston and move it axially in one direction in said cylinder, manually operated means for selectively moving said piston axially in said one direction in said cylinder in the absence of hydraulic pressure in said pressure chamber, and piston return means; a seal and valve arrangement comprising:

an annular groove in the outer peripheral surface of said piston, said annular groove having substantially flat side walls and a bottom wall;

passage means spaced radially inwardly of the outer peripheral surface of said piston providing a fluid connection between said groove and said pressure chamber, said passage means intersecting said groove bottom wall and the radially inner portions of said side walls;

and a rubber-like annular seal having a substantially rectangular cross section and received in said groove, the outer peripheral surface of said seal sealingly and slidably engaging said cylinder, the axial thickness of said seal being less than the axial thickness of said annular groove;

said piston outer peripheral surface being spaced radially inwardly from said cylinder, said seal being forced to one position by pressure in said hydraulic pressure chamber and said passage means tightly against most of the area of one groove side wall and in tight sealing but sliding engagement with said cylinder when hydraulic pressure in said pressure chamber acts to move said piston in said one axial direction, said seal being moved axially relative to said groove to another position spaced from said one groove side wall and engaged with most of the area of the other of said groove side walls when said manually operated means moves said piston axially in said one axial direction, said seal then being so positioned as to open a fluid flow path from said exhaust chamber between said cylinder and the outer peripheral surface of said piston and in said groove between said seal and said one groove side wall and radially inwardly of said seal and through said passage means to said pressure chamber, said open fluid flow path substantially preventing pressurization of hydraulic fluid in said exhaust chamber when said piston is manually moved axially so that manually operated movement of said piston is not hydraulically resisted by pressure in said exhaust chamber.

2. In a hydraulic brake booster motor having a housing, a bore in said housing defining a cylinder, a pressure responsive power piston reciprocably received in said cylinder and dividing said cylinder into a pressure chamber and an exhaust chamber, an output member connected to be moved by said piston to actuate a master cylinder, control valve means for selectively causing hydraulic pressure in said pressure chamber to act on said piston and move it axially in the master cylinder actuating direction in said cylinder, manually operated means for selectively moving said piston axially in said master cylinder actuating direction in said cylinder in the absence of hydraulic pressure in said pressure chamber, and piston return means; a seal and valve arrangement comprising:

an annular groove in the outer peripheral surface of said piston, said annular groove having substantially flat side walls and a bottom wall;

passage means spaced radially inwardly of the outer peripheral surface of said piston providing a fluid connection between said groove and said pressure chamber, said passage means intersecting said groove bottom wall and the radially inner portions of said side walls;

and a rubber-like annular seal having a substantially rectangular cross section and received in said groove, the outer peripheral surface of said seal sealingly and slidably engaging said cylinder, the axial thickness of said seal being less than the axial thickness of said annular groove;

said piston outer peripheral surface being spaced radially inwardly from said cylinder, said seal being forced to one position by pressure in said hydraulic pressure chamber and said passage means tightly against most of the area of one groove side wall and in tight sealing but sliding engagement with said cylinder when hydraulic pressure in said pressure chamber acts to move said piston in said master cylinder actuating direction, said seal being moved axially relative to said groove to another position spaced from said one groove side wall and engaged with most of the area of the other of said groove side walls when said manually operated means moves said piston axially in said master cylinder actuating direction, said seal then being so positioned as to open a fluid flow path from said exhaust chamber between said cylinder and the outer peripheral surface of said piston and in said groove between said seal and said one groove side wall and radially inwardly of said seal and through said passage means to said pressure chamber, said open fluid flow path substantially preventing pressurization of hydraulic fluid in said exhaust chamber when said piston is manually moved in said master cylinder actuating direction so that manually operated movement of said piston is not resisted by hydraulic pressure in said exhaust chamber.

* * * * *